Aug. 1, 1933.  N. A. OLSSON ET AL  1,920,911
COKING APPARATUS
Filed Nov. 20, 1929   10 Sheets-Sheet 3

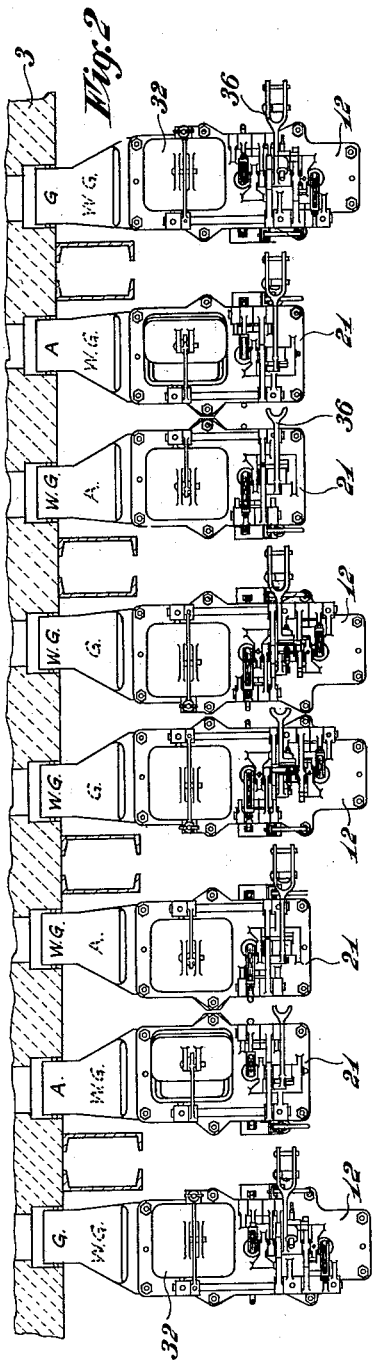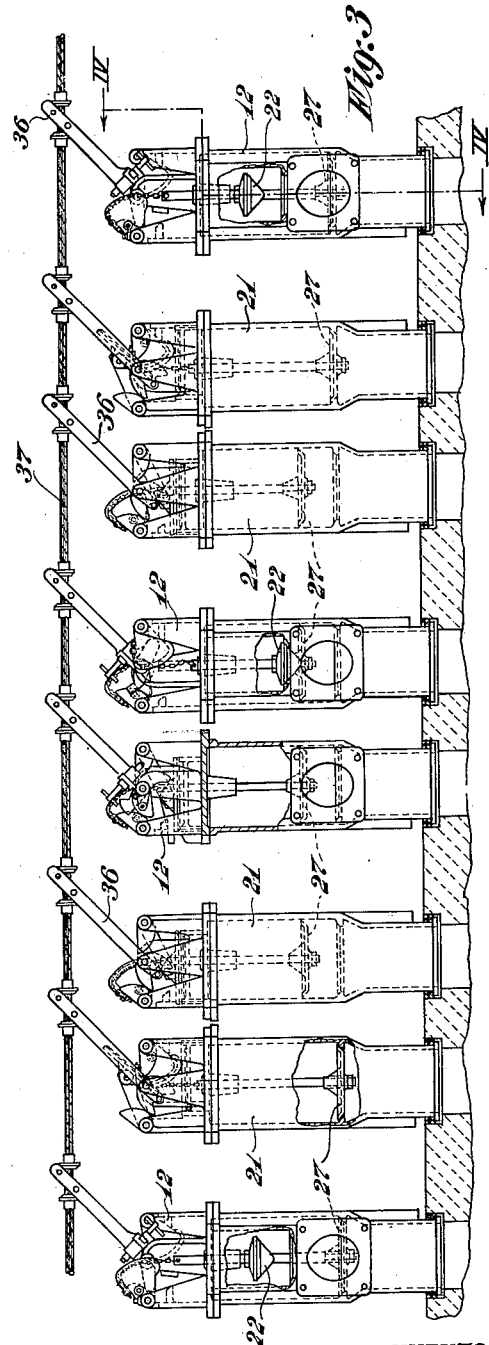

INVENTORS.
Nils Albin Olsson, and
Chauncey P. Fuller.
BY Jesse R. Langley
ATTORNEY.

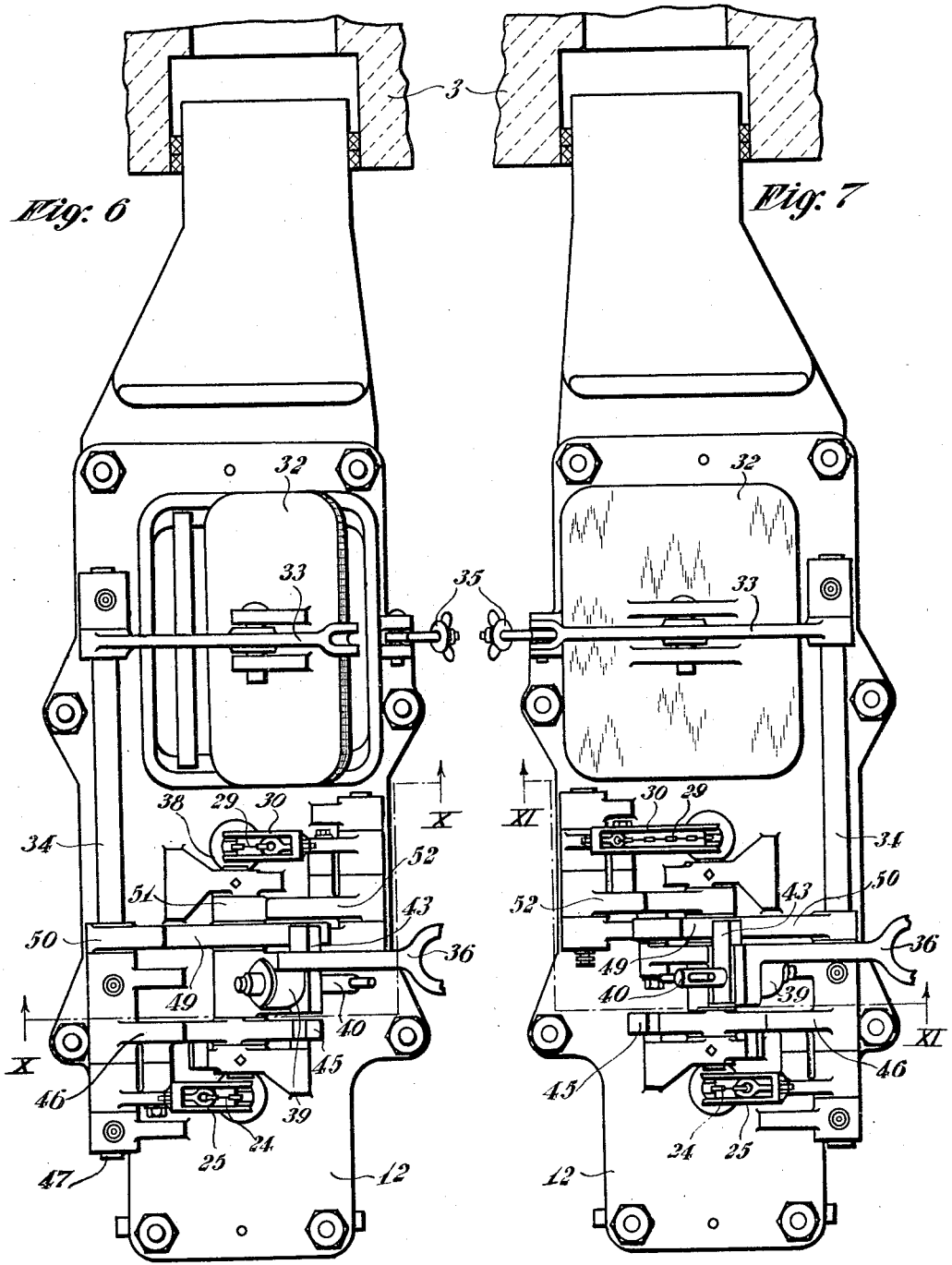

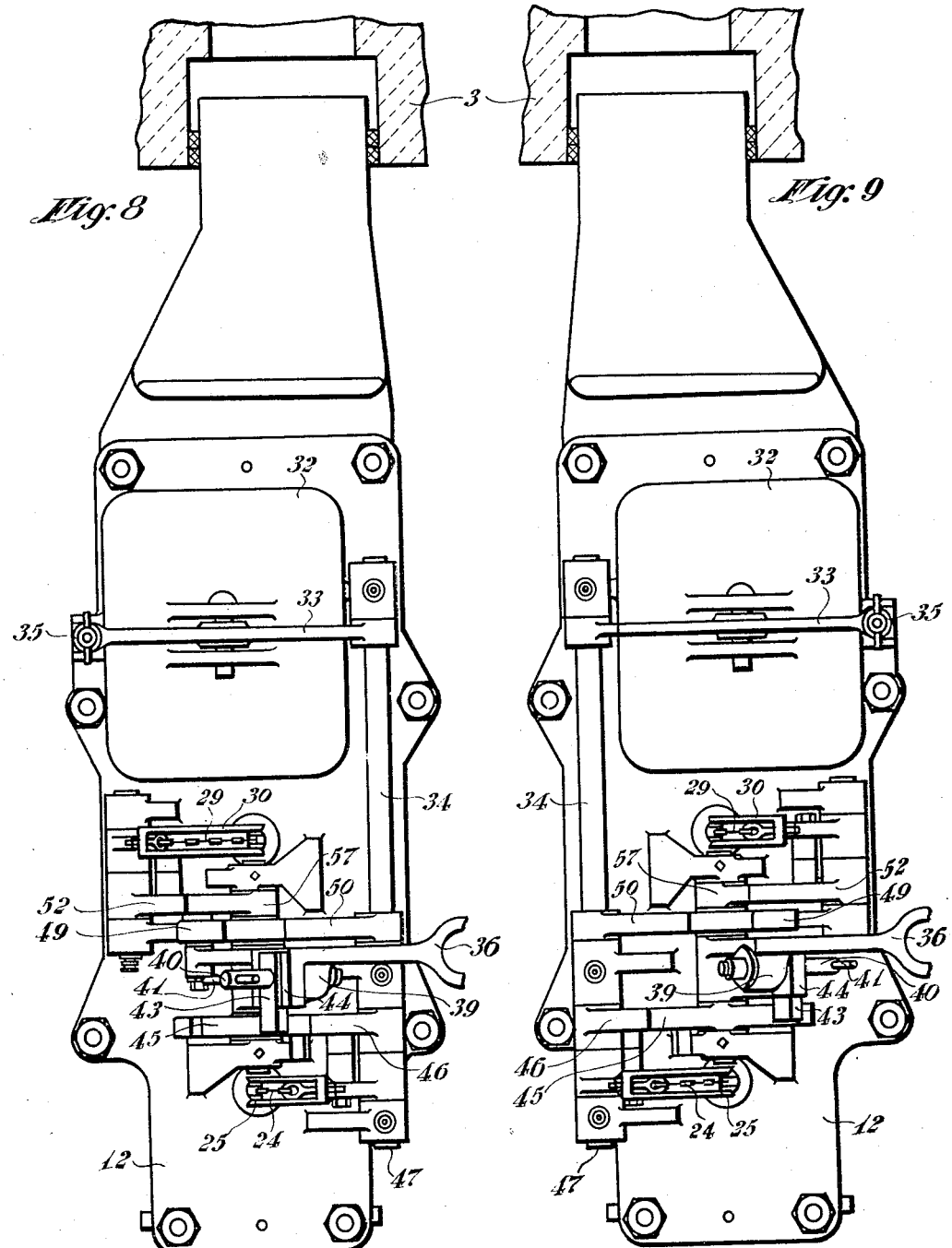

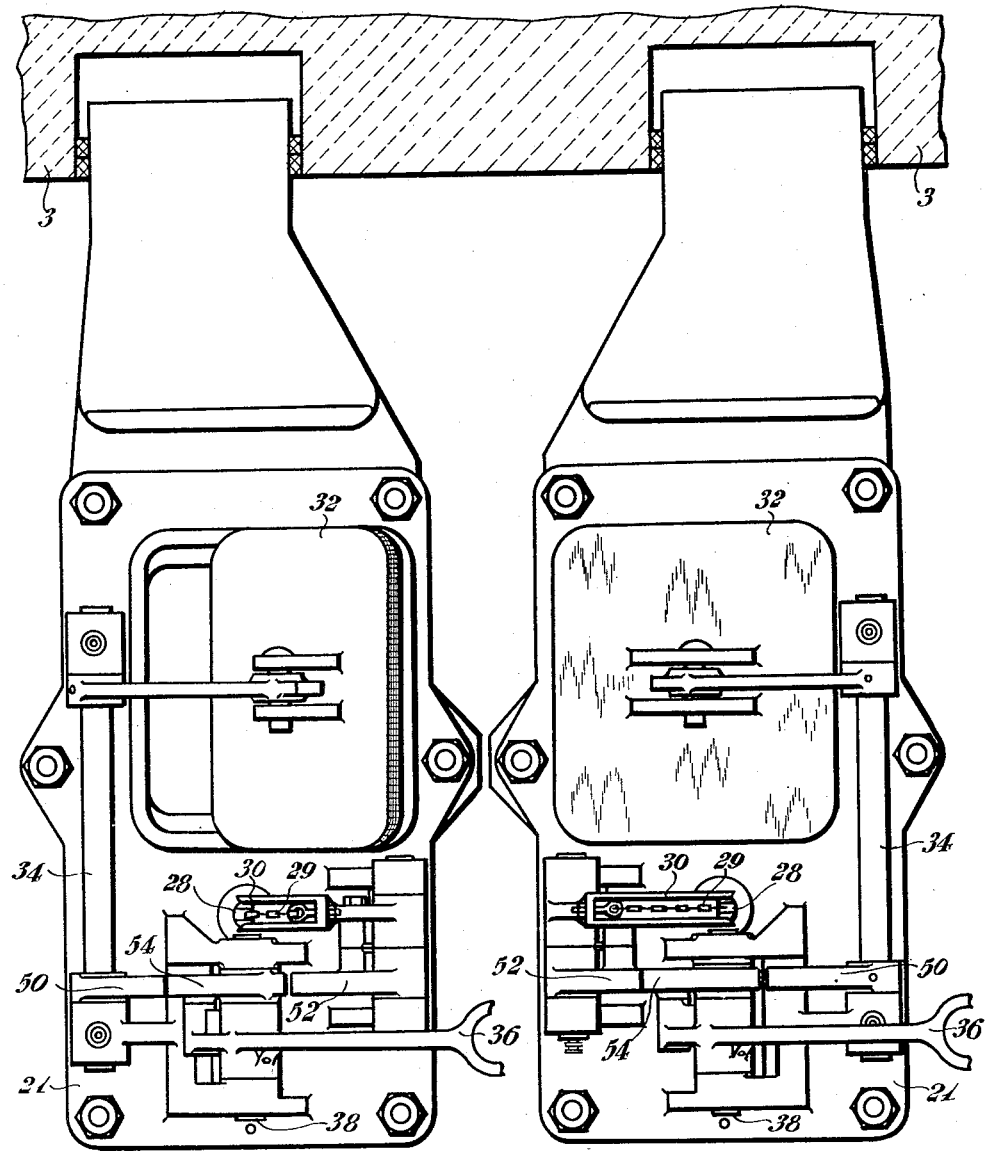

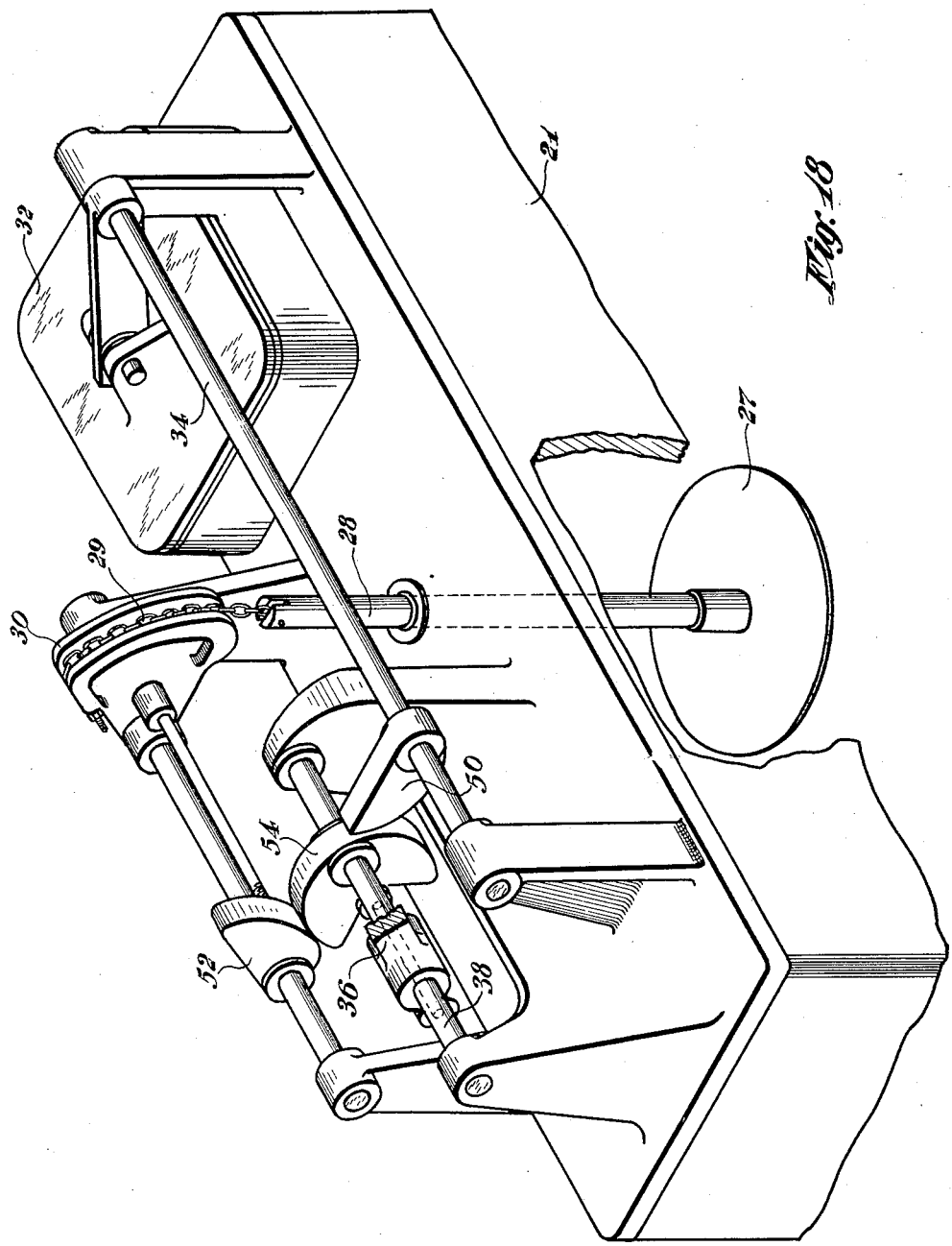

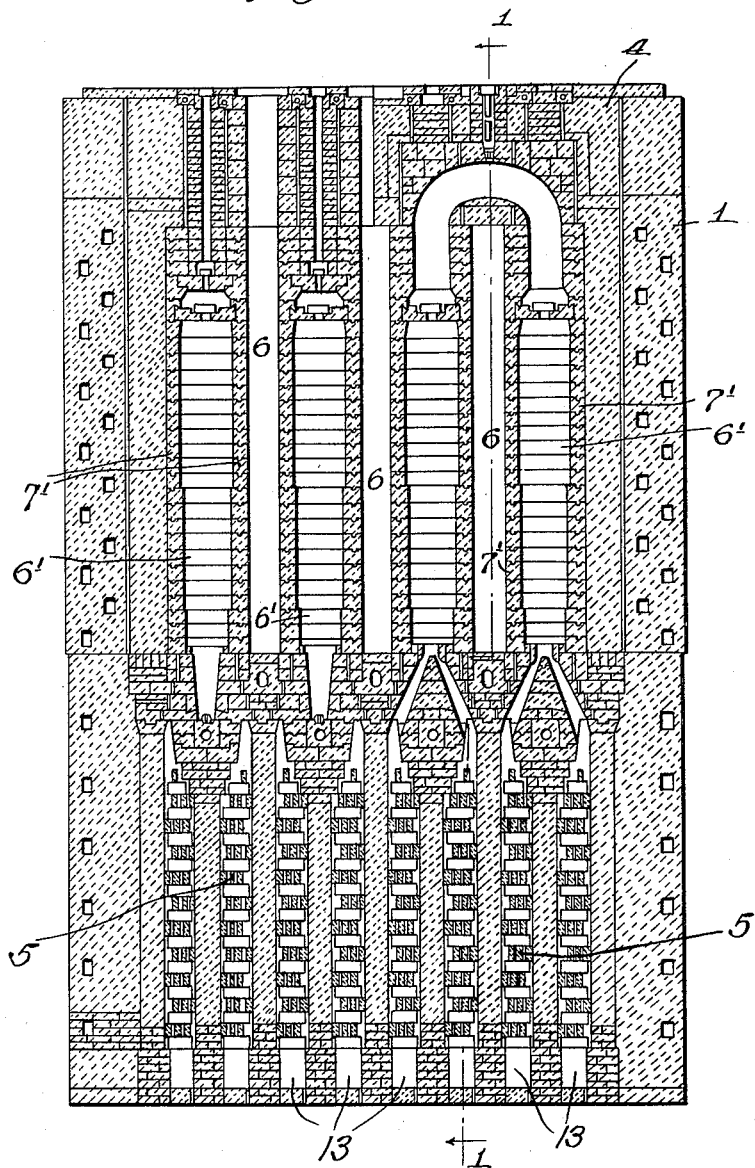

Patented Aug. 1, 1933

1,920,911

UNITED STATES PATENT OFFICE 1,920,911

COKING APPARATUS

Nils Albin Olsson, Bellevue, and Chauncey P. Fuller, Pittsburgh, Pa., assignors to The Koppers Company of Delaware, a Corporation of Delaware Application November 20, 1929
Serial No. 408,660

7 Claims. (Cl. 202—151)

Our invention relates to coking apparatus and particularly to reversing valves for controlling the flow of combustible media to coking retort ovens and the flow of waste gases therefrom and to mechanisms for controlling the various valves in proper sequence to reverse the flow of heating gases within the walls of a coke-oven battery.

An object of our invention is to provide simple and improved mechanisms for operating the reversing valves of coking retort ovens whereby the reversing mechanism may be materially simplified.

A further object of our invention is to provide mechanism for operating the reversing valves of coking retort ovens that is of such character that a single reciprocating member may be employed to control the several air, gas and waste gas valves of a coke-oven battery.

A still further object of our invention is to provide valve mechanism of improved design whereby operating friction is reduced and the load is imparted to the actuating mechanism therefor gradually and smoothly and without shock.

It has been standard practice heretofore, in the construction and operation of coking retort ovens, to provide suitable valves for controlling the introduction of producer gas and air for underfiring the coke ovens of a battery. Suitable valves have also been provided for controlling the flow of waste gases from the outflow regenerators to the stack.

It has been necessary to reverse these valves in proper sequence by means of two reciprocating members in the form of rods or cables having reciprocating motions of different character. It has been necessary to provide reversing mechanism for operating the rods that was of a fairly complex nature by reason of the operating characteristics required of the rods.

In accordance with the present invention, the various valves of a coke-oven battery using producer gas are controlled by a single reciprocating member that extends along the side of the battery and to which all of the various valves may be connected.

The valves are connected to the single reciprocating rod in such manner that they are caused to operate in proper sequence to reverse the direction of flow of gases throughout the battery.

The valve mechanism has been so designed as to very materially reduce operating friction and to provide smooth action. The operating load is imparted to the actuating rod and the reversing mechanism therefor gradually and without shock whereby the operating characteristics of the entire reversing mechanism have been materially improved.

The details of our invention will be described in connection with the accompanying drawings, in which Figure 1 is a view taken on line 1—1 of Fig. 19 in transverse vertical section of a portion of a coke-oven battery with our invention applied thereto;

Fig. 2 is a plan view of a portion of the apparatus of our invention for controlling the supply of combustible media to and waste gases from a coke-oven battery, the reciprocating rod being omitted;

Fig. 3 is a side elevational view of the apparatus of Fig. 2, a portion of the reciprocating rod appearing in this view;

Figs. 6 and 7 are plan views of valve mechanisms for operation in connection with producer gas as a fuel;

Figs. 8 and 9 are similar views of similar apparatus;

Figs. 14 and 15 are plan views of additional forms of apparatus embodying our invention;

Fig. 18 is an expanded perspective view of the apparatus of Fig. 17, parts being broken away;

Fig. 19 is a longitudinal vertical cross-sectional view of the coking retort oven battery embodying our invention.

Figure 1:
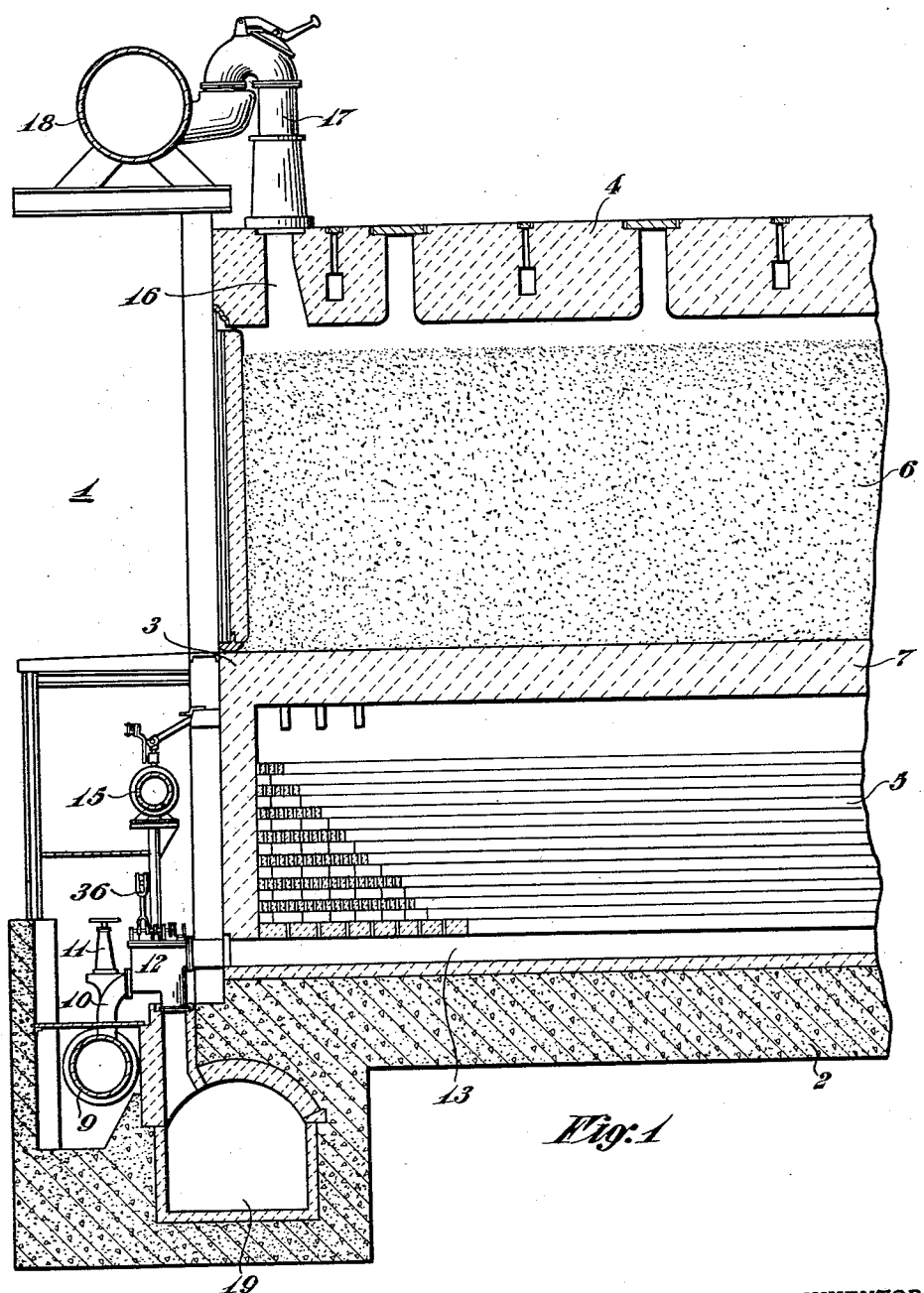

Referring particularly to Figs. 1 and 19, a coke-oven battery 1 comprises a foundation 2, a side wall 3 and a roof 4. A series of crosswise regenerators 5 extends above the foundation 2 and a series of oven chambers 6 that extend across the battery is separated from the regenerators by a floor 7. The regenerators 5 are connected to the usual vertical flues 6' of heating walls 7' that alternate with the oven chambers 6.

The battery is provided with a heating system therefor comprising a producer gas main 9 that is adapted to be connected to each of certain of the regenerators 5 by means of a pipe 10 controlled by a valve 11, the pipe 10 being connected to a reversing box 12 that is connected to the sole flue 13 of the regenerator. The battery 1 is also provided with a coke-oven gas main 15 for supplying the heating walls with fuel gas when it is so desired.

Products of distillation are removed from the oven chambers 6 by means of offtake openings 16 and ascension pipes 17 that are connected to a collecting main 18. Products of combustion or waste gases are removed through the regenerators 5, sole flues 13 and corresponding reversing boxes that are connected to a waste gas main 19.

A portion of the system of reversing boxes and the controlling mechanisms therefor is shown in each of Figs. 2 and 3. The reversing boxes are of two types, depending upon the service for which they are designed. Reversing boxes 12, one of which is shown in Fig. 1, are arranged for the control of the supply of producer gas or air to alternate pairs of regenerators and the outflow of waste gases therefrom. The other pairs of reversing boxes 21 are adapted only to control the admission of air or the outflow of waste gases, as the case may be.

In the arrangement shown in Figs. 2 and 3, it will be noted that the waste gas regenerators indicated by WG are adjacent to air regenerators indicated by A, which separate the waste gas regenerators from the gas regenerators, the latter being indicated by G. This relation of the regenerators is maintained in each direction of flow of the combustible media to the regenerators and the flow of waste gases therefrom. Upon reversal, the air regenerators and the gas regenerators become waste gas regenerators while the waste gas regenerators to which reversing boxes 21 are connected become air regenerators and the central pair of waste gas regenerators to which the reversing boxes 12 are connected become gas regenerators.

When producer gas is used as a fuel, air is supplied only through one member of each pair of reversing boxes 21, the air inlets or dampers of the reversing boxes 12 being clamped in their closed positions, as will be hereinafter described. However, when coke-oven gas is used as a fuel, all of the reversing boxes 12 are used to supply air or control the outflow of waste gases, as the case may be, in the same manner as the reversing boxes 21, in which case the producer gas valves are not operated.

Figure 4:
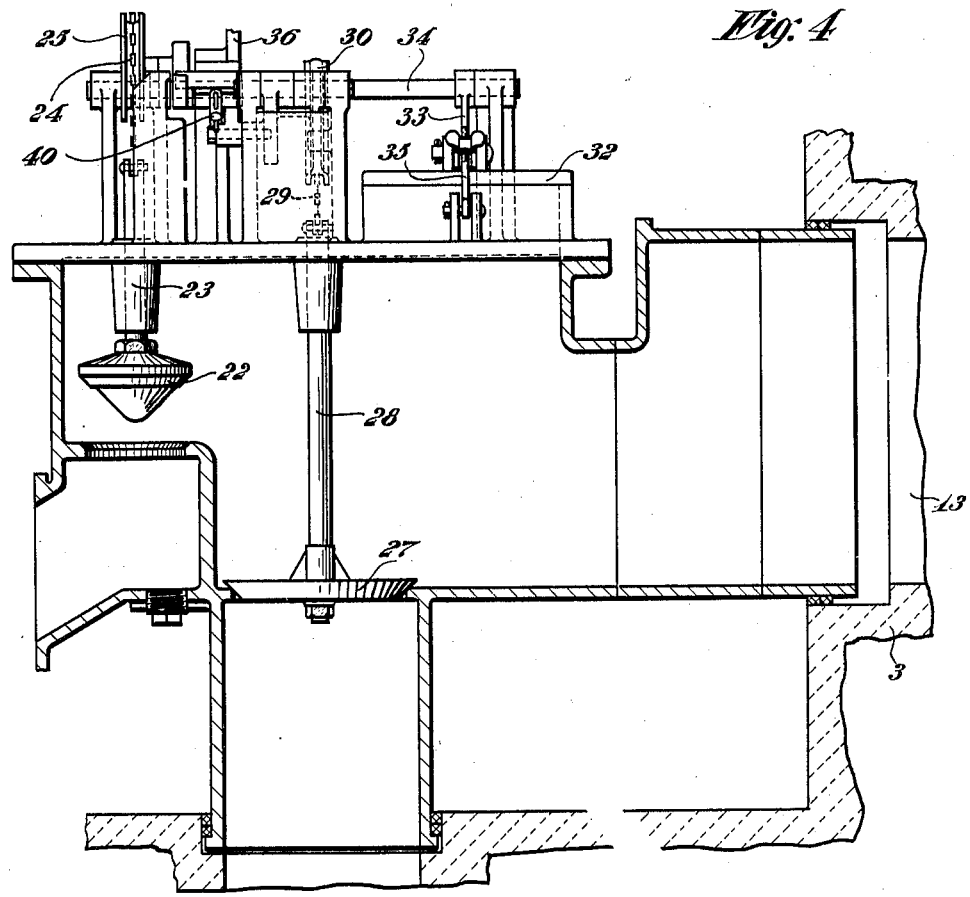
Fig. 4 is a vertical sectional view of one of the valve mechanisms taken on line IV—IV of Fig. 3.

Reference may now be had to Figs. 4, 6 and 7, in each of which a reversing box 12 and certain of the parts connected thereto are shown in enlarged detail. A producer gas valve 22 for controlling the connections between the reversing box 12 and the producer gas main 9 is mounted on a freely slidable plunger 23 that is suspended by a flexible connector 24 from a quadrant 25.

A waste gas valve 27 which controls the connection between the sole flue 13 of the corresponding regenerator and the waste gas main 19 is mounted on a relatively long slidable plunger 28 that is suspended by a flexible connector 29 from a quadrant 30.

An air valve or damper 32 is pivotally connected to an arm 33 that is rigidly mounted on a rotatable shaft 34. The air damper 32 is adapted to be secured in closed position by a pivotally-mounted clamp 35 for engaging the end of the arm 33.

Figure 5:
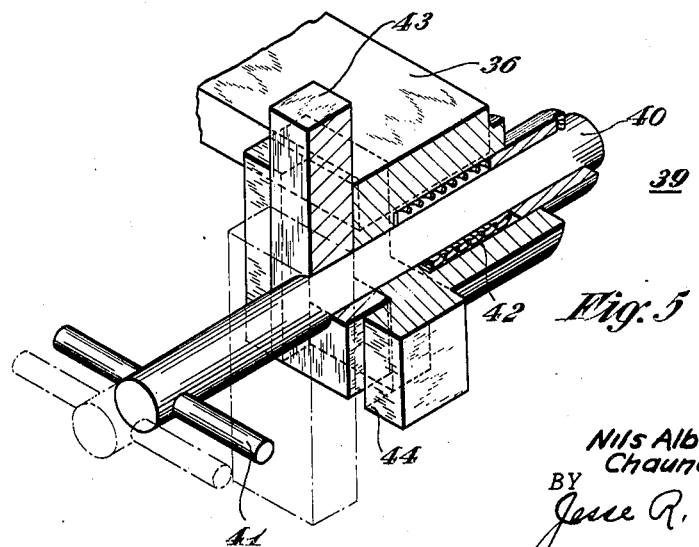
Fig. 5 is an enlarged perspective view, partially in section, of a clutch shown in Fig. 4.
Figure 10:
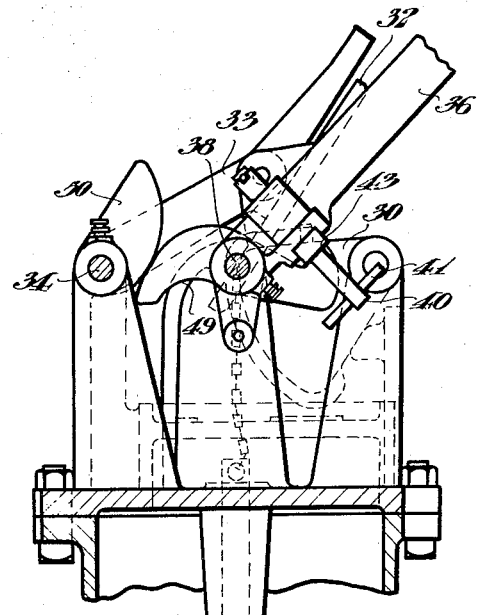
Figs. 10 and 11 are vertical sectional views taken on lines X—X of Fig. 6 and XI—XI of Fig. 7, respectively.
Figure 11:
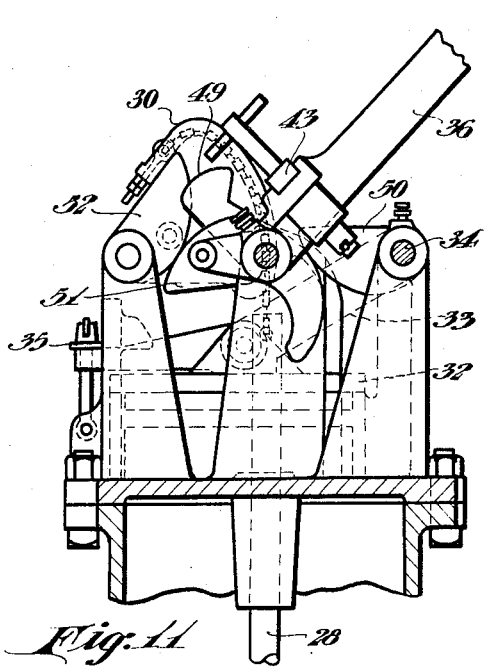
Figure 12:
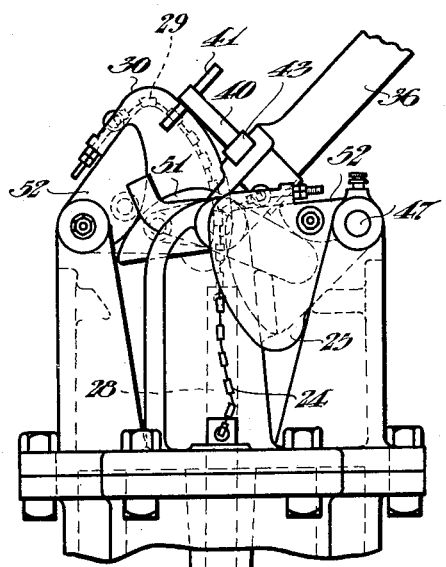
Figs. 12 and 13 are end elevational views of the apparatus of Figs. 8 and 9, respectively.
Figure 13:
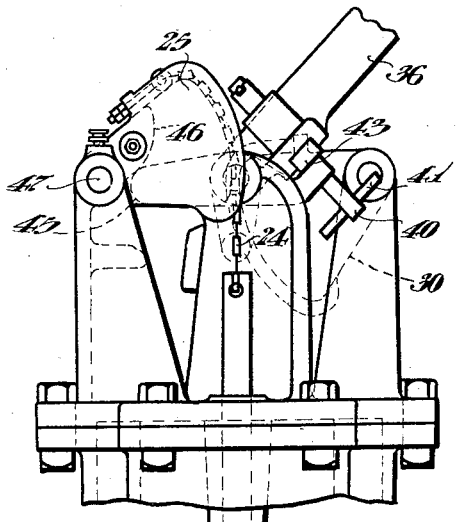
Figure 16:
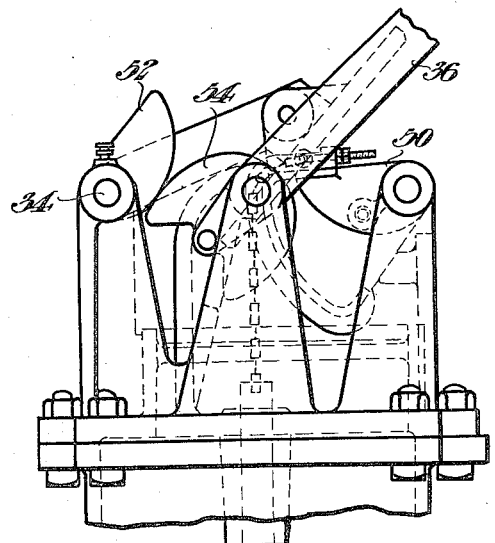
Figs. 16 and 17 are end elevational views of the apparatus of Figs. 14 and 15, respectively.
Figure 17:
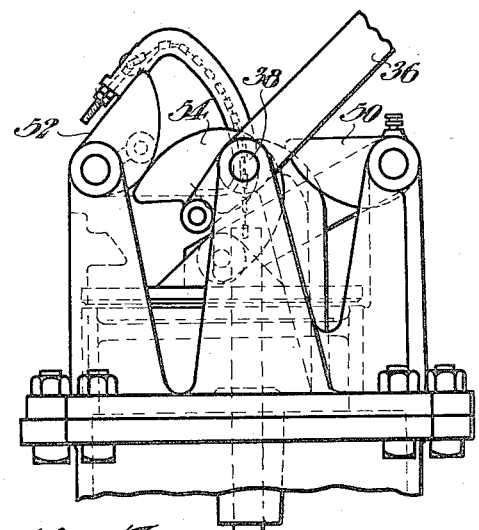

The several valves of each of the reversing boxes 12 and 21 are controlled by an operating lever 36, all of the levers being rocked by a single cable or rod 37 that is reciprocated by the usual time-controlled reversing mechanism of the battery. Each of the operating levers 36 is loosely mounted on a stationary shaft 38. In the case of the reversing boxes 12, each lever 36 is provided with a clutch 39, the details of which are shown in enlarged perspective in Fig. 5.

The clutch 39 comprises a spindle 40 having a transverse pin 41 at its outer end whereby it may be reciprocated against the force of a coil spring 42 for the purpose of rotating a bar 43 that extends transversely of the spindle 40. The bar 43 is not symmetrical with respect to the spindle 40. Normally the bar 43 is retained between shoulders 44 on the lever 36 by the force of the spring 42.

When the clutch bar 43 is in its operative position in which it is illustrated in Figs. 8 and 9, its longer end engages a horn-like projection 44 on a cam 45 that is loosely mounted on the stationary shaft 38 to cause the cam 45 to rotate a second cam 46 that is connected to the quadrant 25, the cam 46 and quadrant 25 being loosely mounted on a shaft 47. In this position of the clutch bar 43, the lever 36 controls the operation of the producer gas valve 22 and the waste gas valve 27. The lever 36 does not affect the positions of the air dampers 32.

When the clutch bar 43 is in a second operative position 180° from that previously described, as shown in Figs. 6 and 7, its longer end engages a cam 49 which, in turn, operates a cam 50 that is rigidly connected to the shaft 34 for controlling the air valve 32. In this position of the clutch bar, the cams 45 and 46 and the quadrant 25 remain stationary during the operation of the lever 36 and producer gas valve 22 remains closed.

Thus, it will be noted that the clutch 39 determines by the position of its clutch bar 43 whether the reversing box 12 supplies air or producer gas to its corresponding regenerator.

A cam 51 which is movable with the lever 36 and is loosely mounted on the shaft 38 is in constant engagement with a cam 52 which is operatively connected to the quadrant 30 for controlling the waste gas valve 27.

It will be noted, from an inspection of Figs. 2, 3, 6, 7, 8 and 9, that certain of the reversing boxes 12 are assembled in what may be termed a right-hand assembly while others are arranged in a left-hand assembly whereby similar movements of their operating levers 36 produce opposite effects upon the corresponding valves. For example, it may be noted that in the reversing box 12 at the extreme right in Figs. 2 and 3, the producer gas valve 22 is open while the producer gas valve 22 of the right center reversing box 12 in the same figures is closed, although the operating levers 36 occupy similar positions. The same effect upon the positions of the waste gas valves 27 and the air valves or dampers 32 is produced by the inverse relation of parts in the respective right-hand and left-hand assemblies.

The operating mechanism for each of the reversing boxes 21 is somewhat similar to that described for the reversing boxes 12 except that in each box 21 the operating mechanism for the producer gas valve 22 and its connected parts is omitted since these boxes are adapted only for the control of air inflow and waste gas outflow. Accordingly, the operating levers 36 of the boxes 21 are not provided with a clutch mechanism 39 since it is not necessary to effect alternative connections.

The boxes 21 are also arranged in right-hand and left-hand assemblies in order that the same operation of their operating levers 36 may produce opposite effects. For example, it may be noted that in the case of the pair of reversing boxes 21 in Figs. 2 and 3, they are assembled in inverse relation in order that one of them may admit air to, while the other permits waste gases to flow from, the respective regenerators while the operating levers 36 are in similar positions.

Reference may now be had to Figs. 14 to 18, inclusive, in which the details of the reversing boxes 21 are illustrated. Similar reference numerals are employed to designate parts corresponding to those of the reversing boxes 12. The reversing boxes 21 are arranged for the control only of the admission of air to the regenerators or the discharge of waste gases therefrom.

Each lever 36 of the reversing boxes 21 is connected to a double cam 54 which coacts with the cams 50 and 52 that respectively control the air damper 32 and the waste gas valve 27. When the lever 36 is actuated to the right, as viewed in Fig. 18, the air damper 32 is closed and the waste gas valve 27 is opened. Movement of the lever 36 to the left reverses the positions of the air damper 32 and the waste gas valve 27.

As in the case of the reversing boxes 12, the reversing boxes 21 are provided in pairs, in which the parts are in inverse relation in order that the levers 36, when in similar positions, may produce opposite effects upon the positions of the air damper 32 and the waste gas valve 27. These respective arrangements are illustrated in Figs. 14 and 15 and the corresponding views 16 and 17. It will be noted, for example, that in Fig. 14 the air damper 32 is open while the air damper 32 in Fig. 15 is closed, although the levers 36 of the pair of reversing boxes are in corresponding positions.

In the operation of a coke-oven battery employing reversing boxes constructed in accordance with our invention, it may be assumed that the several reversing boxes shown in Figs. 2 and 3 are arranged to supply gas and air as indicated by legends G and A, respectively, to the corresponding regenerators and that the reversing boxes indicated by the legend WG are arranged to permit the discharge of waste gases from the regenerators to which they are respectively connected. To reverse the flow of gases throughout the battery, the cable 37 is actuated to the left, as viewed in Figs. 2 and 3, and all of the levers 36 are actuated to produce changes in the positions of the various valves in accordance with the arrangement of the various connections thereto, as will be described.

In the case of the reversing boxes 21 which previously supplied air, the cam 54 operates to permit the closure of the air damper 32 and, in proper sequence, to open the valve 27 to permit the outflow of waste gases. The reversing boxes 21 which previously were arranged to transmit waste gases are operated by the cam 54 to close the waste gas valves 27 and to open the air dampers 32 in proper sequence.

When producer gas is used as a fuel, as is assumed in the present case, half of the reversing boxes 12 are arranged to permit the outflow of waste gases in one direction of flow in the battery and the other half of the reversing boxes 12 are arranged to supply producer gas, the clutch bars 43 being arranged as shown in Figs. 8 and 9 to connect the corresponding levers 36 to the cam 45 for controlling the quadrant 25 connected to the producer gas valves 22. The cam 49 for controlling the mechanism connected to the air dampers 32 is not connected to the lever 36 and the air dampers are permitted to remain stationary and are clamped in their closed positions, as shown in Figs. 8 and 9.

Accordingly, when the levers 36 are reversed, the reversing boxes 12 which were transmitting waste gas become gas boxes by the operation of the cam mechanism to permit the waste gas valves 27 to close by gravity and to actuate the producer gas valves 22 to their upper or open positions. The reversing boxes 12 which have been supplying producer gas are operated through the corresponding cam mechanisms to permit the gas valves 22 to close by gravity and to open the waste gas valves 27.

The various boxes 12 and 21 in the typical section shown in Figs. 2 and 3 now have the functions indicated by the legends in dotted lines. The succeeding reversal of the cable 37 will cause all of the boxes to change their operation to that indicated by the legends in solid lines, as previously described.

When coke-oven gas is used as a fuel for underfiring the ovens of the battery, the functions of the reversing boxes 21 will remain the same and no change is necessary therein. In the case of the reversing boxes 12, however, it will be necessary for them to supply air instead of producer gas. Accordingly, the clutch bar 43 is rotated 180° to disconnect the levers 86 from the cams 45 and to connect them to the cams 49 whereby the levers 36 control the operation of the air dampers 32 instead of the producer gas valves 22, the connections to the waste gas valves 27 remaining the same.

In the operation of the system employing coke-oven gas, all of the boxes marked WG in Fig. 2 will transmit waste gas in one direction of flow in the battery while those marked A and G will all transmit air. Upon reversal of the cable 37, the waste gas boxes transmit air while the air boxes change to waste gas boxes.

In the operation of the several reversing boxes 12, the cam mechanisms are so arranged that the gas valves are always closed before the waste gas valves begin to open and the gas valves do not begin to open until the waste gas valves are fully closed.

The waste gas valves and the air valves of the several boxes 12 and 21 are, however, so arranged that their open positions overlap somewhat whereby the one set of valves will not close until the other set of valves has been opened to a certain degree. This arrangement is employed because it is undesirable to subject the battery to the draft of the stack, which would tend to create a vacuum if either all of the air valves or all of the waste gas valves were entirely closed, since they are connected through the interior passageways of the battery.

It will be appreciated that, by means of the arrangements for controlling the several valves for admitting air and fuel gas and for controlling the discharge of waste gas, a simple and efficient means has been provided whereby all of the valves for controlling the heating system of a battery may be controlled by a single reciprocating device. The provision of right-hand and left-hand assemblies of the several reversing boxes insures that the same movement of the controlling levers will produce opposite effects upon the boxes controlled by them whereby similar reversing boxes operate successively in the two phases of the reversing cycle.

Our invention has materially simplified the mechanism heretofore employed in controlling the heating systems of coke-oven batteries since the sequence of the several valves is assured because they are all connected to the same actuating cable. We have eliminated the more or less complicated interlocks that have been necessary heretofore when two cables were employed.

Explosions have occurred in coke-oven structures because of the breakage of one cable and the operation of the other cable with the result that air and gas were permitted to form an explosive mixture outside of the combustion flues. Our arrangement insures that explosive mixtures cannot be formed by the opening or closing of valves in improper sequence, such, for example, as might be caused by the breakage of one of a plurality of actuating rods or cables.

The arrangement of the cams insures, also, that the valves of any reversing box operate in proper sequence with respect to each other and also with respect to the valves of other reversing boxes.

Our arrangement possesses the further advantage that the friction and, accordingly, the power required to operate the various valve mechanisms has been materially reduced by the provision of cams which roll upon each other without relative movement of their engaging surfaces.

The foregoing and other advantages will be apparent to those skilled in the art relating to the operation of coke-oven batteries. Our invention is not limited to the embodiment herein shown and described except as indicated by the appended claims.

We claim as our invention:

1. Coking apparatus comprising structure adapted for combustion therein, means for conducting air and fuel gas to and waste gases from said structure and comprising reversing boxes for controlling the supply of combustible media to said structure and the discharge of waste gases therefrom, each of said reversing boxes comprising a valve for controlling the supply of fuel gas, a second valve for controlling the supply of air and a third valve for controlling the flow of waste gases, a controlling member connected to said third valve and means for selectively connecting said controlling member to either the fuel gas valve or the air valve.

2. Coking apparatus and regenerative combustion heating means therefor, said means comprising a reversing box for controlling the flow of combustible media or waste gases therethrough and having a valve for fuel gas, a valve for air and a valve for waste gases, a controlling member connected to the waste gas valve, and a member for alternatively connecting said controlling member to the fuel gas valve or the air valve.

3. Coking apparatus comprising a reversing box having valves for respectively controlling the flow of fuel gas, air and waste gases, said valves being biased by gravity to their closed positions, means for controlling said valves comprising a lever, cam mechanisms for connecting said lever to said valves and a clutch for selectively determining the connection of said lever to the fuel gas valve or the air valve, and means for actuating said lever.

4. A coke oven and regenerative combustion heating means therefor, said means comprising two passageways for conveying fuel gas and air respectively for combustion in said means, a valve for each passageway, an oscillatable lever, a shaft oscillatable with said lever and means for selectively connecting said shaft to the one or the other of said valves.

5. A coke oven and regenerative combustion heating means therefor, said means comprising two passageways for conveying combustion media for combustion in said means, two valves for controlling said passageways respectively, a single oscillatable lever, a shaft connected thereto, and means comprising a clutch for selectively connecting said shaft to the one or the other of said valves.

6. A coke oven and regenerative combustion heating means therefor, said means comprising two passageways for conveying combustion media for combustion in said means, two valves for controlling said passageways respectively, a single oscillatable lever, a shaft connected thereto, a member carried by said shaft, and means comprising an adjustable pin carried by said member for connecting the latter to the one or the other of said valves.

7. A coke oven and regenerative combustion heating means therefor, said means comprising passageways for conveying fuel gas and air to, and waste combustion gases from, respectively, one of the regenerators, a single oscillatable lever, a shaft oscillatable therewith, and means for connecting said lever to the valve for waste gases and for selectively connecting said shaft to the fuel gas valve or the air valve.

NILS ALBIN OLSSON.
CHAUNCEY P. FULLER.